United States Patent
Lu et al.

(10) Patent No.: US 10,100,155 B2
(45) Date of Patent: Oct. 16, 2018

(54) POLYORGANOSILOXANE AND A MOISTURE AND RADIATION CURABLE ADHESIVE COMPOSITION COMPRISING THE SAME

(71) Applicants: Henkel IP & Holding GmbH, Duesseldorf (DE); Henkel AG & Co. KGaA, Duesseldorf (DE)

(72) Inventors: Zhixiang Lu, East Lyme, CT (US); Zhiming Li, Shanghai (CN); Jinyou Li, Shanghai (CN); Zheng Lu, South Glastonbury, CT (US); Yong Zhang, Shanghai (CN)

(73) Assignees: Henkel IP & Holding GmbH, Duesseldorf (DE); Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/695,104

(22) Filed: Sep. 5, 2017

(65) Prior Publication Data
US 2018/0009953 A1    Jan. 11, 2018

Related U.S. Application Data

(63) Continuation of application No. PCT/CN2015/073943, filed on Mar. 10, 2015.

(51) Int. Cl.
*C08G 77/08*    (2006.01)
*C08G 77/44*    (2006.01)
*C09J 183/10*   (2006.01)

(52) U.S. Cl.
CPC .......... *C08G 77/44* (2013.01); *C09J 183/10* (2013.01)

(58) Field of Classification Search
CPC .............................. C08G 77/44; C09J 183/10
See application file for complete search history.

(56) References Cited

U.S. PATENT DOCUMENTS

| | | |
|---|---|---|
| 5,663,269 A | 9/1997 | Chu et al. |
| 5,795,650 A | 8/1998 | Watanabe et al. |
| 6,140,444 A * | 10/2000 | Levandoski .......... C08G 77/08 502/158 |
| 6,800,366 B2 | 10/2004 | Chang et al. |
| 6,828,355 B1 | 12/2004 | Chu |
| 2013/0271828 A1 | 10/2013 | Everaerts et al. |

OTHER PUBLICATIONS

International Search Report for International PCT Patent Application No. PCT/CN2015/073943 dated Dec. 21, 2015.

* cited by examiner

*Primary Examiner* — Michael B Nelson
(74) *Attorney, Agent, or Firm* — James E. Piotrowski

(57) ABSTRACT

The present invention relates to a polyorganosiloxane and a moisture and radiation curable adhesive composition comprising the same, in particular, to a polyorganosiloxane and a moisture and radiation curable adhesive composition used in a liquid optical clear adhesive (LOCA) for handheld device and display (HHDD).

19 Claims, No Drawings

POLYORGANOSILOXANE AND A MOISTURE AND RADIATION CURABLE ADHESIVE COMPOSITION COMPRISING THE SAME

TECHNICAL FIELD

The present invention relates to a polyorganosiloxane and a moisture and radiation curable adhesive composition comprising the same, in particular, to a polyorganosiloxane and a moisture and radiation curable adhesive composition used in a liquid optical clear adhesive (LOCA) for handheld device and display (HHDD).

BACKGROUND

In display applications, optical clear adhesives (OCA) or liquid optical clear adhesives (LOCA) are usually used to bond a touch panel or cover glass to a substrate which could be distortion sensitive. Optical clear adhesives used in the area of HHDDs will have potential problem of light leaking after long term use, especially for big displays after long-term temperature/humidity change. The root cause is the build-up of the stress on the distortion sensitive substrate and on the adhesive. The stress will result in the change of the orientation of the molecules in the substrate. As a result, the path of the light will be changed, and the light from the device will be guided to the edges, and in turn the quality of the images will be reduced.

Many efforts have been made to provide LOCAs which can significantly decrease or eliminate the build-up of the stress and avoid the light leaking.

For example, US 20130271828 A1 discloses an optical bonding layer including an optical film e.g. pressure sensitive adhesive (PSA) film and a first liquid optically clear adhesive (LOCA) positioned adjacent the optical film. The LOCA was used to relieve the stress on the PSA and on the polarizer. However, the process becomes more complicated, since two steps of the application of both PSA and LOCA are required. In addition, the LOCA was cured instantly, and the stress from the PSA during the paving and the stress from the LOCA during the curing will be added up.

U.S. Pat. No. 5,795,650 A discloses a pressure-sensitive adhesive sheet which comprises a base material layer; and a pressure-sensitive adhesive layer which contains a pressure-sensitive adhesive composition and a plasticizer, wherein the weight-average molecular weight of the main polymer of the pressure-sensitive adhesive composition of the pressure-sensitive adhesive layer is 600,000 to 2,000,000. The plasticizer is supposed to be effective in relaxing a stress due to the polarizer shrinkage. However, using a PSA with the capacity for stress relaxation to relieve the stress build-up in a polarizer unit shows insufficient durability in resisting the formation and growth of bubbles and edge lifting in high temperature and high humidity conditions.

U.S. Pat. No. 6,800,366 B2 discloses an acryl-based PSA composition comprising a component having a positive stress optical coefficient. The purpose of introducing the component was to compensate the birefringence caused by the stress in the polarizer and PSA. However, the control on the compensation cannot be precise due to the complicated change in the structures of the polarizer and the PSA during the thermal cycles. In addition, the light leaking cannot be avoided.

As such, there remains a need to develop an improved adhesive composition which can solve the problem of the build-up of the stress and light leaking, while remaining other performances such as high transmittance and high stability under high temperature/humidity.

SUMMARY OF THE INVENTION

One aspect of the present invention is a polyorganosiloxane represented by the structural formula (1):

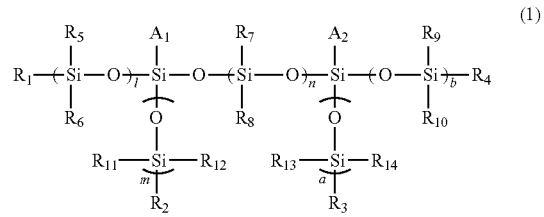

wherein:
$R_1$ to $R_{14}$ are each independently selected from the group consisting of $C_1$-$C_{20}$ alkyl, $C_1$-$C_{20}$ alkoxyl, $C_2$-$C_{20}$ alkenyl, $C_3$-$C_{20}$ cycloalkyl, $C_7$-$C_{22}$ aralkyl, and (meth)acryloxy, with the proviso that at least one of $R_1$ to $R_4$ is $C_1$-$C_{20}$ alkoxyl,
a is an integer of from 0 to 1000,
b is an integer of from 0 to 1000,
l is an integer of from 0 to 1000,
m is an integer of from 1 to 1000,
n is an integer of from 1 to 1500,
$A_1$ and $A_2$ are each independently represented by the formula (2):

wherein:
$R_{15}$ is $C_1$-$C_{20}$ alkylene,
$R_{16}$ is $C_6$-$C_{21}$ arylene,
$R_{17}$ is $C_1$-$C_{20}$ alkylene,
$R_{18}$ is (meth)acryloxy,
c is an integer of from 0 to 10,
d is an integer of from 0 to 10, and
e is an integer of from 0 to 10.

Another aspect is a process for producing the polyorganosiloxane according to the present invention, comprising the steps of:
(1) end-capping a silanol-terminated polyorganosiloxane with an alkoxysilane having a (meth)acryloxy group;
(2) extending the chain of the polyorganosiloxane obtained in step (1) by reacting with a silanol-terminated polyorganosiloxane; and
(3) end-capping the residual silanol groups contained in the product obtained in step (2).

Yet another aspect is a moisture and radiation curable composition, comprising:
(a) the polyorganosiloxane according to the present invention,
(b) a photoinitiator,
(c) a moisture catalyst,
(d) a reactive plasticizer, and
(e) optionally, a moisture crosslinker.

Yet another aspect is a cured reaction product of the moisture and radiation curable adhesive composition according to the present invention.

Yet another aspect is a coated substrate which is coated on at least one surface with the moisture and radiation curable adhesive composition or the cured product according to the present invention.

Yet another aspect is the use of the polyorganosiloxane, the moisture and radiation curable adhesive composition or the cured product according to the present invention in manufacturing display panels, touch panels or optical devices.

Other features and aspects of the subject matter are set forth in greater detail below.

DETAILED DESCRIPTION

It is to be understood by one of ordinary skill in the art that the present discussion is a description of exemplary embodiments only, and is not intended as limiting the broader aspects of the present invention.

As used herein, the term "$C_1$-$C_{20}$ alkyl" refers to a monovalent linear or branched moiety containing only single bonds between carbon atoms in the moiety and including, for example, $C_1$-$C_{18}$-, $C_1$-$C_{12}$-, $C_1$-$C_{10}$-, $C_1$-$C_8$-, $C_1$-$C_6$- or $C_1$-$C_4$-alkyl. Examples thereof are methyl, ethyl, propyl, isopropyl, n-butyl, sec-butyl, isobutyl, tert-butyl, n-pentyl, n-hexyl, heptyl, 2,4,4-trimethylpentyl, 2-ethylhexyl, n-octyl, n-nonyl, n-decyl, n-undecyl, n-dodecyl, n-hexadecyl, n-octadecyl and n-eicosyl.

As used herein, "$C_2$-$C_{20}$ alkenyl group" refers to a straight or branched chain hydrocarbon having from two to twenty carbon atoms, with at least one unsaturation, and including, for example, $C_2$-$C_{18}$-, $C_2$-$C_{12}$-, $C_2$-$C_{10}$-, $C_2$-$C_8$-, $C_2$-$C_6$- or $C_2$-$C_4$-alkenyl. Typical examples are groups such as vinyl, allyl, 1-propen-2-yl, 1-buten-4-yl, 2-buten-4-yl and 1-penten-5-yl.

As used herein, the term "$C_1$-$C_{20}$ alkoxyl" refers to the group —O—R wherein R is $C_1$-$C_{20}$-alkyl as defined above, and including for example, $C_1$-$C_{18}$-, $C_1$-$C_{12}$-, $C_1$-$C_{10}$-, $C_1$-$C_8$-, $C_1$-$C_6$- or $C_1$-$C_4$-alkoxyl.

As used herein, the term "$C_6$-$C_{20}$ aryl" refers to an monovalent unsaturated aromatic carbocyclic group of from 6 to 20 carbon atoms having a single ring (e.g., phenyl) or multiple condensed (fused) rings, wherein at least one ring is aromatic (e.g., naphthyl, dihydrophenanthrenyl, fluorenyl, or anthryl). Preferred examples include phenyl, naphthyl, phenantrenyl and the like.

As used herein, the term "$C_7$-$C_{22}$ alkylaryl" refers to aryl groups having from 7 to 22 carbon atoms and an alkyl substituent, including methyl phenyl, ethyl phenyl, methyl naphthyl, ethyl naphthyl, and the like.

As used herein, the term "$C_1$-$C_{20}$ alkylene" refers to a divalent linear or branched moiety containing only single bonds between carbon atoms in the moiety and including, for example, $C_1$-$C_{18}$-, $C_1$-$C_{12}$-, $C_1$-$C_{10}$-, $C_1$-$C_8$-, $C_1$-$C_6$- or $C_1$-$C_4$-alkylene. Examples thereof are methylene, ethylene, propylene, isopropylene, n-butylene, sec-butylene, isobutylene, tert-butylene, n-pentylene, n-hexylene, n-heptylene, 2,4,4-trimethylpentylene, 2-ethylhexylene, n-octylene, n-nonylene, n-decylene, n-undecylene, n-dodecylene, n-hexadecylene, n-octadecylene and n-eicosylene.

As used herein, the term "$C_6$-$C_{20}$ arylene" refers to a divalent unsaturated aromatic carbocyclic group of from 6 to 20 carbon atoms having a single ring (e.g., phenylene) or multiple condensed (fused) rings, wherein at least one ring is aromatic (e.g., naphthylene, dihydrophenanthrenylene, fluorenylene, or anthrylene). Preferred examples include phenylene, naphthylene, phenantrenylene and the like.

As used herein, the term "(meth)acryloxy group" represents both acryloxy and methacryloxy groups.

As used herein, the above groups may be further substituted or unsubstituted. When substituted, hydrogen atoms on the groups are replaced by substituent group(s) that is(are) one or more group(s) independently selected from alkyl, alkenyl, alkynyl, cycloalkyl, cycloalkenyl, cycloalkynyl, aryl, heteroaryl, heteroalicyclyl, aralkyl, heteroaralkyl, (heteroalicyclyl)alkyl, hydroxy, protected hydroxyl, alkoxy, aryloxy, acyl, ester, mercapto, alkylthio, arylthio, cyano, halogen, carbonyl, thiocarbonyl, O-carbamyl, N-carbamyl, O-thiocarbamyl, N-thiocarbamyl, C-amido, N-amido, S-sulfonamido, N-sulfonamido, C-carboxy, protected C-carboxy, O-carboxy, isocyanato, thiocyanato, isothiocyanato, nitro, silyl, sulfenyl, sulfinyl, sulfonyl, haloalkyl, haloalkoxy, trihalomethanesulfonyl, trihalomethanesulfonamido, and amino, including mono- and di-substituted amino groups, and the protected derivatives thereof. In case that an aryl is substituted, substituents on an aryl group may form a non-aromatic ring fused to the aryl group, including a cycloalkyl, cycloalkenyl, cycloalkynyl, and heterocyclyl.

All percentages, parts and ratios are based upon the total weight of the compositions of the present invention, unless otherwise specified. All such weights as they pertain to listed ingredients are based on the active level and, therefore, do not include carriers or by-products that may be included in commercially available materials.

The Polyorganosiloxane

In one aspect, the present disclosure is generally directed to a polyorganosiloxane represented by the structural formula (1):

$$R_1 \!-\!\!(\!Si\!-\!O\!)_{\!l}\!\!\underset{\underset{R_6}{|}}{\overset{\underset{R_5}{|}}{Si}}\!-\!O\!-\!(\!Si\!-\!O\!)_{\!n}\!\!\underset{\underset{R_8}{|}}{\overset{\underset{R_7}{|}}{Si}}\!-\!O\!)_{\!n}\!\underset{\underset{O}{|}}{\overset{\underset{A_2}{|}}{Si}}\!(\!O\!-\!\underset{\underset{R_{10}}{|}}{\overset{\underset{R_9}{|}}{Si}}\!)_{\!b}\!R_4 \quad (1)$$

$$R_{11}\!-\!\underset{\underset{R_2}{|}}{\overset{|}{Si}}_{\!m}\!-\!R_{12} \quad R_{13}\!-\!\underset{\underset{R_3}{|}}{\overset{|}{Si}}_{\!a}\!-\!R_{14}$$

wherein:
$R_1$ to $R_{14}$ are each independently selected from the group consisting of $C_1$-$C_{20}$ alkyl, $C_1$-$C_{20}$ alkoxyl, $C_2$-$C_{20}$ alkenyl, $C_3$-$C_{20}$ cycloalkyl, $C_7$-$C_{22}$ aralkyl, and (meth)acryloxy,
a is an integer of from 0 to 1000,
b is an integer of from 0 to 1000,
l is an integer of from 0 to 1000,
m is an integer of from 1 to 1000,
n is an integer of from 1 to 1500,
$A_1$ and $A_2$ are each independently represented by the formula (2):

$$(R_{15})_c(R_{16})_d(R_{17})_e R_{18} \quad (2)$$

wherein:
$R_{15}$ is $C_1$-$C_{20}$ alkylene,
$R_{16}$ is $C_6$-$C_{21}$ arylene,
$R_{17}$ is $C_1$-$C_{20}$ alkylene,
$R_{18}$ is (meth)acryloxy,
c is an integer of from 0 to 10,
d is an integer of from 0 to 10, and
e is an integer of from 0 to 10.

In one embodiment, $R_1$ to $R_{14}$ are each independently selected from the group consisting of $C_1$-$C_{20}$ alkyl, $C_1$-$C_{20}$ alkoxyl, $C_2$-$C_{20}$ alkenyl, $C_3$-$C_{20}$ cycloalkyl, $C_7$-$C_{22}$ aralkyl, and (meth)acryloxy, preferably selected from the group consisting of $C_1$-$C_8$ alkyl, $C_1$-$C_8$ alkoxyl, $C_2$-$C_8$ alkenyl, $C_3$-$C_8$ cycloalkyl, and $C_7$-$C_{16}$ aralkyl, more preferably $C_1$-$C_6$ alkyl or $C_1$-$C_6$ alkoxyl.

In one embodiment, at least one of $R_1$ to $R_4$ is $C_1$-$C_8$ alkoxyl, and the others of $R_1$ to $R_{14}$ are each independently selected from the group consisting of $C_1$-$C_8$ alkyl, $C_2$-$C_8$ alkenyl, $C_3$-$C_8$ cycloalkyl, and $C_7$-$C_{16}$ aralkyl. More preferably, at least two of $R_1$ to $R_4$ is $C_1$-$C_6$ alkoxyl, and the others of $R_1$ to $R_{14}$ are each independently selected from $C_1$-$C_6$ alkyl and $C_1$-$C_6$ alkoxyl, for example, methyl, ethyl, propyl, isopropyl, n-butyl, sec-butyl, isobutyl, tert-butyl, pentyl, hexyl, methoxy, ethoxy, propoxy, n-butoxy, sec-butoxy, isobutoxy, tert-butoxy, n-pentoxy, n-hexoxy, etc.

In one preferred embodiment, at least two of $R_1$ to $R_4$ are $C_1$-$C_6$ alkoxyl, preferably methoxy, and the others of $R_1$ to $R_{14}$ are independently $C_1$-$C_6$ alkyl, preferably methyl.

In another preferred embodiment, $R_1$ to $R_{14}$ is each independently $C_1$-$C_6$ alkyl, preferably methyl.

In another embodiment, the indices a, b, l and m are each independently of an integer of from 1 to 800, preferably from 50 to 400, and n is an integer of from 1 to 1200, preferably from 100 to 800.

In yet another embodiment, with respect to $A_1$ and $A_2$ represented by the formula:

$(R_{15})_c(R_{16})_d(R_{17})_eR_{18}$ (2)

$R_{15}$ is $C_1$-$C_4$ alkylene, preferably $C_1$-$C_4$ alkylene, more preferably methylene or ethylene. $R_{16}$ is $C_6$-$C_9$ alkylene, preferably phenylene or naphthalene. $R_{17}$ is $C_1$-$C_8$ alkylene, preferably $C_1$-$C_4$ alkylene, more preferably methylene or ethylene. The index c is an integer of from 1 to 5, preferably from 1 to 3, d is an integer of from 0 to 5, preferably from 0 to 3, and e is an integer of from 0 to 5, preferably from 0 to 3.

In one preferred embodiment, $R_{15}$ is methylene, a is 3, b and c are 0, and thus $A_1$ and $A_2$ each independently is (meth)acryloxypropyl group, preferably acryloxypropyl group.

In another preferred embodiment, $R_{15}$ is ethylene, $R_{16}$ is phenylene, $R_{17}$ is methylene, a, b and c are 1, and thus $A_1$ and $A_2$ each independently is (meth)acryloxymethylphenethyl group, preferably acryloxymethylphenethyl group.

In one embodiment, the present invention provides a polyorganosiloxane represented by formula (1), wherein n=430, m and a=68, l and b=0, $A_1$ and $A_2$=acryloxypropyl, $R_2$, $R_3$, $R_5$ to $R_{14}$=methyl, $R_1$ and $R_4$=methoxy.

In another embodiment, the present invention provides a polyorganosiloxane represented by formula (1), wherein n, a, and m=190, l and b=0, $A_1$ and $A_2$=methacryloxymethyl, $R_1$ to $R_{14}$=methyl.

In another embodiment, the present invention provides a mixture of polyorganosiloxanes, each represented by formula (1), wherein:
(i) n=430, m and a=68, l and b=0, $A_1$ and $A_2$=acryloxypropyl, $R_1$ and $R_4$=methoxy, and $R_2$, $R_3$, $R_5$ to $R_{14}$=methyl;
(ii) n=430, l, m and a=68, b=0, $A_1$ and $A_2$=acryloxypropyl, $R_1$ to $R_3$ and $R_5$ to $R_{14}$=methyl, and $R_4$=methoxy; and
(iii) n=430, l, m, a and b=68, $A_1$ and $A_2$=acryloxypropyl, $R_1$ to $R_{14}$=methyl.

In yet another embodiment, the present invention provides a mixture of polyorganosiloxanes, each represented by formula (1), wherein:
(i) n=430, m and a=68, l and b=0, $A_1$ and $A_2$=acryloxypropyl, $R_1$ and $R_4$=methoxy, and $R_2$, $R_3$, $R_5$ to $R_{14}$=methyl;
(ii) n=430, m=68, a, b and l=0, $A_1$ and $A_2$=acryloxypropyl, $R_1$=methoxy, $R_2$ to $R_{14}$=methyl; and
(iii) m and n=430, a=68, b and l=0, $A_1$ and $A_2$=acryloxypropyl, $R_1$ and $R_4$=methoxy, and $R_2$, $R_3$, $R_5$ to $R_{14}$=methyl.

In yet another embodiment, the present invention provides a mixture of polyorganosiloxanes, each represented by formula (1), wherein:
(i) n, a and m=190, l and b=0, $A_1$ and $A_2$=methacryloxymethyl, $R_1$ to $R_{14}$=methyl;
(ii) n=190, m=190, l, a and b=0, $A_1$ and $A_2$=methacryloxymethyl, $R_1$ to $R_3$ and $R_5$ to $R_{14}$, $R_4$=methoxy; and
(iii) m and n=190, l, a and b=0, $A_1$ and $A_2$=methacryloxymethyl, $R_1$ to $R_{14}$=methyl.

The mixtures of polyorganosiloxane according to the present invention can comprise both (meth)acryloxy and alkoxyl groups in the structure. These groups allow the polyorganosiloxanes to cure when exposed to moisture and photo radiation.

Preparation of the Polyorganosiloxane

The polyorganosiloxane according to the present invention is prepared by the process comprising the steps of:
(1) end-capping silanol-terminated polyorganosiloxane (1) with an alkoxysilane having a (meth)acryloxy group;
(2) extending the chain of the polyorganosiloxane obtained in step (1) by reacting the polyorganosiloxane with silanol-terminated polyorganosiloxane (2); and
(3) end-capping the residual silanol groups contained in the product obtained in step (2).

More specifically, in step (1), the reactants are reacted with agitation in the absence of moisture and in the presence of organolithium catalyst until the desired amount of silanol capping has occurred. The desired equivalent ratio of silanol groups to alkoxysilane is preferably from about 1:0.95 to about 1:1.5, and more preferably from about 1:1 to about 1:1.2.

Any volatile materials remaining in the reaction mixture after the capping has reached the required level can be removed by a mild heating e.g. 50° C. to 100° C. under reduced pressure. An inert gas can be passed through the reaction mixture during the removal of the volatile materials.

The silanol-terminated reactant used in step (1) can be virtually any useful silanol-terminated material within the formula (3):

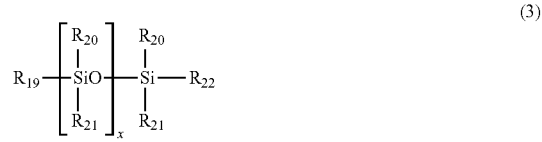

(3)

wherein $R_{20}$ and $R_{21}$ are each independently selected from the group consisting of $C_1$-$C_{20}$ alkyl, $C_1$-$C_{20}$ alkoxyl, $C_2$-$C_{20}$ alkenyl, $C_3$-$C_{20}$ cycloalkyl, and $C_7$-$C_{22}$ aralkyl; $R_{19}$ and $R_{22}$ are selected from the group consisting of hydroxyl, $C_1$-$C_{20}$ alkyl, $C_1$-$C_{20}$ alkoxyl, $C_2$-$C_{20}$ alkenyl, $C_3$-$C_{20}$ cycloalkyl, and $C_7$-$C_{22}$ aralkyl, and at least one of $R_{19}$ and $R_{22}$ is hydroxyl; and x is from about 1 to about 1,200, such as about 10 to about 1,000.

Preferably, $R_{20}$ and $R_{21}$ are each independently selected from the group consisting of $C_1$-$C_8$ alkyl, $C_1$-$C_8$ alkoxyl, $C_2$-$C_8$ alkenyl, $C_3$-$C_8$ cycloalkyl, and $C_7$-$C_{16}$ aralkyl. More preferably, $R_{20}$ to $R_{21}$ are each independently selected from $C_1$-$C_6$ alkyl and $C_1$-$C_6$ alkoxyl, for example, methyl, ethyl, propyl, isopropyl, n-butyl, sec-butyl, isobutyl, tert-butyl, pentyl, hexyl, methoxy, ethoxy, propoxy, n-butoxy, sec-butoxy, isobutoxy, tert-butoxy, n-pentoxy, n-hexoxy, etc. Most preferably, $R_{19}$ and $R_{20}$ are both methyl.

In one embodiment, $R_{19}$ is hydroxyl and $R_{22}$ is selected from the group consisting of $C_1$-$C_8$ alkyl, $C_1$-$C_8$ alkoxyl, $C_2$-$C_8$ alkenyl, $C_3$-$C_8$ cycloalkyl, and $C_7$-$C_{16}$ aralkyl, more preferably $C_1$-$C_6$ alkyl and $C_1$-$C_6$ alkoxyl, for example, methyl, ethyl, propyl, isopropyl, n-butyl, sec-butyl, isobutyl, tert-butyl, pentyl, hexyl, methoxy, ethoxy, propoxy, n-butoxy, sec-butoxy, isobutoxy, tert-butoxy, n-pentoxy, n-hexoxy, etc., and thus the reactant is a monosilanol-terminated polyorganosiloxane, preferably monosilanol-terminated polydimethylsiloxane.

In another embodiment, $R_{19}$ and $R_{22}$ are both hydroxyl, and thus the reactant is a disilanol-terminated polyorganosiloxane, preferably disilanol-terminated polydimethylsiloxane.

The viscosities of the silanol-terminated organopolysiloxanes in step (1) are within the range of from about 1 cps to about 150,000 cps, preferably from about 100 cps to about 10,000 cps measured using a Brookfield viscometer, at a temperature of about 25° C. (room temperature).

The alkoxysilane having (meth)acryloxy group includes a silane containing at least two alkoxy groups and at least one (meth)acryloxy group. More specifically, the alkoxysilane having (meth)acryloxy group includes at least one compound of the formula (5):

$$(R_{23})_f(R_{24})_g Si(OR_{25})_{4-(f+g)} \quad (5)$$

wherein $R_{23}$ to $R_{25}$ are each independently selected from the group consisting of $C_{1-20}$ alkyl, $C_{2-20}$ alkyl and $C_{6-20}$ aryl, preferably $C_{1-6}$ alkyl, $C_{2-6}$ alkyl and $C_{6-14}$ aryl such as methyl, ethyl, n-propyl, isopropyl, phenyl, vinyl, and allyl groups. At least one of $R_{23}$ and $R_{24}$ is (meth)acryloxy group, and f is 0, 1 or 2; g is 0, 1 or 2; and f+g is 1 or 2.

Representative alkoxysilane having (meth)acryloxy group useful in the present invention include: (γ-acryloxymethyl)phenethyltrimethoxysilane, (γ-acryloxymethyl)trimethoxysilane, (γ-acryloxypropyl)methylbis(trimethylsiloxy)silane, (γ-acryloxypropyl)methyldimethoxysilane, (γ-acryloxypropyl)methyldiethoxysilane, (γ-acryloxypropyl)trimethoxysilane, (γ-acryloxypropyl)tris(trimethylsiloxy)silane, (γ-methacryloxypropyl)bis(trimethylsiloxy)methylsilane, (γ-methacryloxymethyl)bis(trimethylsiloxy)methylsilane, (γ-methacryloxymethyl)methyldimethoxysilane, (γ-methacryloxymethylphenethyl)tris(trimethylsiloxy)silane, (γ-methacryloxymethyl)tris(trimethylsiloxy)silane, (γ-methacryloxypropyl)methyldimethoxysilane, (γ-methacryloxypropyl)methyldiethoxysilane, (γ-methacryloxypropyl)triethoxysilane, (γ-methacryloxypropyl)triisopropoxysilane, (γ-methacryloxypropyl)trimethoxysilane, (γ-methacryloxypropyl)tris(methoxyethoxy)silane, and (γ-methacryloxypropyl)tris(trimethylsiloxy)silane.

Preferably, the alkoxysilane having (meth)acryloxy group is selected from (γ-acryloxymethyl)phenethyltrimethoxysilane, (γ-acryloxypropyl)trimethoxysilane, (γ-acryloxymethyl)trimethoxysilane, and combination thereof.

The organolithium reagent is preferably an alkyl lithium, such as methyl, n-butyl, sec-butyl, t-butyl, n-hexyl, 2-ethylhexyl and n-octyl lithium. Other useful catalysts include phenyl lithium, vinyl lithium, lithium phenylacetylide, lithium (trimethylsilyl) acetylide, lithium silanolates and lithium siloxanolates. The organo group can also be an amine-containing group, such as dimethylamine, diethylamine, diisopropylamine or dicyclohexylamine, or a silicone-containing group.

Generally, the amount of lithium in the reaction mixture is from 1 ppm to about 1000 ppm, preferably from about 5 ppm to about 500 ppm, such as from about 8 ppm to about 200 ppm, based on the weight of the reactants in step (1).

The amount of the organolithium catalyst used in the catalyst system depends on the reactivity of the silanol group-containing reactant and the reactivity of the alkoxysilane containing the polymerizable ethylenically unsaturated group. The amount chosen may be readily determined by those persons skilled in the art.

The reaction in step (1) can be carried out at temperatures of from about room temperature (about 25° C.) to about 150° C. The temperature at which the steps are conducted depends on the particular reactants chosen, the identity and amount of the constituents of the catalyst system and the length of time the reaction can proceed.

In step (2), the reactants are reacted with agitation in the absence of moisture and in the presence of organolithium catalyst until the desired amount of chain extension has occurred by monitoring the viscosity of the product in the reaction. The desired equivalent ratio of silanol groups to alkoxy in the polyorganosiloxane obtained in step (1) is preferably from about 1:0.95 to about 1:1.5, and more preferably from about 1:1 to about 1:1.2.

Any volatile materials remaining in the reaction mixture after the chain extension has reached the required level can be removed by a mild heating e.g. 50° C. to 100° C. under reduced pressure. An inert gas can be passed through the reaction mixture during the removal of the volatile materials.

The silanol-terminated reactant used in step (2) can be also represented by the formula (3) as described above and has a viscosity in the range as described above.

The organolithium catalyst in steps (2) can be the same as used in step (1), and the amount of lithium in the reaction mixture is from 1 ppm to about 1000 ppm, preferably from about 5 ppm to about 500 ppm, such as from about 8 ppm to about 200 ppm, based on the weight of the reactants in step (2).

In one preferred embodiment, the silanol-terminated polyorganosiloxane (1) is a monosilanol-terminated polyorganosiloxane, preferably monosilanol-terminated polydimethylsiloxane (ω-hydroxyl terminated polydimethylsiloxane), and the silanol-terminated polyorganosiloxane (2) is a disilanol-terminated polyorganosiloxane, preferably disilanol-terminated polydimethylsiloxane (α,ω-hydroxyl terminated polydimethylsiloxane).

In another preferred embodiment, the silanol-terminated polyorganosiloxane (1) is a disilanol-terminated polyorganosiloxane, preferably disilanol-terminated polydimethylsiloxane, and the silanol-terminated polyorganosiloxane (2) is a monosilanol-terminated polyorganosiloxane, preferably monosilanol-terminated polydimethylsiloxane.

In another preferred embodiment, both of the silanol-terminated polyorganosiloxanes (1) and (2) are disilanol-terminated polyorganosiloxanes, preferably disilanol-terminated polydimethylsiloxanes. As such, the end-capping of step (1) and the chain extension in step (2) are undergone simultaneously during the reaction.

The reaction in step (2) can be carried out at temperatures of from about room temperature (about 25° C.) to about 150° C. The temperature at which the steps are conducted depends on the particular reactants chosen, the identity and amount of the constituents of the catalyst system and the length of time the reaction can proceed.

In step (3), the residual silanols contained in the polyorganosiloxane obtained in step (2) and an end-capping agent are reacted with agitation in the absence of moisture and in the presence of organolithium catalyst until the residual silanol group in the product are end-capped.

The organolithium catalyst in steps (3) can be the same as used in step (1) and/or (2), and the amount of lithium in the reaction mixture is from 1 ppm to about 1000 ppm, preferably from about 5 ppm to about 500 ppm, such as from about 8 ppm to about 200 ppm, based on the weight of the reactants in step (2).

Preferably, the organolithium catalysts in steps (1) to (3) are identical, for example n-butyl lithium, and thus the organolithium catalyst in an amount sufficient for steps (1) to (3) is added in step (1) for the sake of simplification of the process.

After the reaction, the organolithium catalyst can be reacted with carbon dioxide, precipitated as lithium carbonate and removed from the reaction mixture by liquid-solid separation means such as centrifuging, filtration and the like.

There is not particular limitation to the end-capping agent. End-capping agent, for example silanes having an end-capping functionality are known to the person skilled in the art. These are silanes which do not contain any sterically bulky radicals and are thus also able to react with the residual silanols contained in the polyorganosiloxane.

Suitable silanes used as end-capping agent are, for example, dimethyldimethoxysilane or hexamethyldisilazane.

Moisture and Radiation Curable Composition

In another aspect, the present invention provides a moisture and radiation curable composition, comprising the components:
(a) the polyorganosiloxane according to the present invention,
(b) a photoinitiator,
(c) a moisture catalyst,
(d) a reactive plasticizer, and
(e) optionally, a moisture crosslinker.

Component (a)

The polyorganosiloxane as described above is present in an amount from 20 to 90% by weight, preferably 30 to 80% by weight, based on the total weight of the components. A mixture of different polyorganosiloxanes as described above can be used as component (a).

Component (b)

The moisture and radiation curable adhesive composition further comprises a photoinitiator to initiate the radiation curing, preferably UV curing of the composition upon receiving sufficient UV radiation.

There is no particular limitation to the photoinitiator useful in the present invention. Suitable photoinitiators include, but are not limited to, organic peroxides, azo compounds, quinones, benzophenones, nitroso compounds, acryl halides, hydrazones, mercapto compounds, pyrylium compounds, triacrylimidazoles, bisimidazoles, chloroalkyltriazines, benzoin ethers, benzil ketals, thioxanthones, acetophenones, acylphosphine oxides, alpha hydroxyl ketones, alpha amino ketones, derivatives of the aforementioned compounds, and mixtures thereof.

Exemplary photoinitiators are benzil ketals such as 2,2-dimethoxy-2-phenyl acetophenone (available from Ciba Specialty Chemicals under the trademark Irgacure 651); acetophenone derivatives such as 2,2-diethoxyacetophenone ("DEAP", available from First Chemical Corporation); 2-hydroxy-2-methyl-1-phenyl-propan-1-one ("HMPP", available from Ciba Specialty Chemicals under the trademark Darocur 1173); 1-hydroxy-cyclohexyl-phenyl ketone (available from Ciba Specialty Chemicals under the name Irgacure 184); 2-benzyl-2-N, N-dimethylamino-1-(4-morpholinophenyl)-1-butanone (available from Ciba Specialty Chemicals under the trademark Irgacure 369); 2-methyl-1-(4-(methylthio)phenyl)-2-morpholinopropan-1-one (available from Ciba Specialty Chemicals under the trademark Irgacure 907); or acylphosphine oxides such as 2,4,6-trimethylbenzoyl diphenylphosphine oxide ("TPO", available from Ciba Specialty Chemicals in 50/50 wt % blends with HMPP (as Irgacure 4265)), bis(2,6-dimethoxybenzoyl)-2,4, 4-trimethylpentylphosphine oxide (available from Ciba Specialty Chemicals in the form of blends with other ketones including: 25/75 wt % blend with HMPP as Irgacure 1700, and 1-hydroxy-cyclohexyl-phenyl-ketone, (or HCPK) as Irgacure 1850 or 1800 depending on proportions), or bis(2, 4,6-trimethylbenzoyfl)-phenylphosphine oxide (available from Ciba Specialty Chemicals under the trademark Irgacure 819).

In one preferred embodiment, the photoinitiator useful in the present invention is selected from the group consisting of 2-hydroxy-2-methyl-1-phenyl-propan-1-one, bis(2,4,6-trimethylbenzoyfl)-phenylphosphine oxide, 1-hydroxy-cyclohexyl-phenyl ketone, 2,4,6-trimethylbenzoyl diphenylphosphine oxide, and the combination thereof. More preferably, the photoinitiator is 2-hydroxy-2-methyl-1-phenyl-propan-1-one.

In the moisture and radiation curable adhesive composition according to the present invention, the component (b) is present in an amount from 0.1 to 5% by weight, preferably 1 to 3% by weight, based on the total weight of the components.

Component (c)

The moisture and radiation curable adhesive composition further comprises a moisture curing catalyst which initiates the moisture curing of the composition in the presence of moisture.

The moisture curing catalysts typically used in the moisture and radiation curable adhesive compositions of this invention include those known to be useful for facilitating moisture curing. The catalysts include metal and non-metal catalysts. Examples of the metal portion of the metal catalysts useful in the present invention include tin, titanium, zirconium, lead, iron cobalt, antimony, manganese, bismuth and zinc compounds.

In one embodiment, the tin compounds useful for facilitating the moisture curing of the composition include but are not limited to dimethyldineodecanoatetin (available from Momentive Performance Materials Inc. under the trade name of FOMREZ UL-28 A), dibutyltindilaurate, dibutyltindiacetate, dibutyltindimethoxide, tinoctoate, isobutyltintriceroate, dibutyltinoxide, solubilized dibutyl tin oxide, dibutyltin bis diisooctylphthalate, bis-tripropoxysilyl dioctyltin, dibutyltin bis-acetylacetone, silylated dibutyltin dioxide, carbomethoxyphenyl tin tris-uberate, isobutyltin triceroate, dimethyltin dibutyrate, dimethyltin di-neodecanoate, triethyltin tartarate, dibutyltin dibenzoate, tin oleate, tin naphthenate, butyltintri-2-ethylhexylhexoate, tinbutyrate, dioctyltin didecylmercaptide, bis(neodecanoyloxy) dioctylstannane, dimethylbis(oleoyloxy)stannane.

In one preferred embodiment, the moisture curing catalyst is selected from the group consisting of dimethyldineodecanoatetin (available from Momentive Performance Materials Inc. under the trade name of FOMREZ UL-28, dioctyltin didecylmercaptide (available from Momentive Performance Materials Inc. under the trade name of FOMREZ UL-32), bis(neodecanoyloxy)dioctylstannane (available from Momentive Performance Materials Inc. under the trade name of FOMREZ UL-38), dimethylbis(oleoyloxy)

stannane (available from Momentive Performance Materials Inc. under the trade name of FOMREZ UL-50), and combination thereof. More preferably, the moisture curing catalyst is dimethyldineodecanoatetin.

In the moisture and radiation curable adhesive composition according to the present invention, the component (c) is present in an amount from 0.05 to 1% by weight, preferably 0.1 to 0.5% by weight, based on the total weight of all components.

Component (d)

The moisture and radiation curable adhesive composition may further comprises a reactive plasticizer.

As used herein, the term "reactive plasticizer" refers to a high molecular weight plasticizer having reactive silicon groups at its terminals or main chain, reacts the polyorganosiloxane and presents in the crosslinking network during curing.

There is no particular limitation to the reactive plasticizer useful in the present invention. One suitable example is a mono(meth)acryloxy terminated linear polyorganosiloxane homopolymer which can be prepared by conventional methods known in the art, for example as disclosed in U.S. Pat. No. 6,140,444 A, the content of which is incorporated by reference in its entirety. Specifically, the mono(meth)acryloxy terminated polyorganosiloxane homopolymer is selected from the group consisting of linear polydimethylsiloxanes terminated by ((meth)acryloxymethyl)phenethyl, (meth)acryloxymethyl, and (meth)acryloxyproxyl groups. More specifically, the polyorganosiloxane homopolymer used as reactive plasticizer is both terminated by (meth)acryloxy and $C_1$ to $C_{20}$ alkoxy, preferably $C_1$ to $C_6$ alkoxy, more preferably methyl. In the moisture and radiation curable adhesive composition according to the present invention, the component (d) is present in an amount from 10 to 60% by weight, preferably 15 to 50% by weight, based on the total weight of the components.

Component (e)

The moisture and radiation curable adhesive composition may optionally comprise a moisture crosslinker.

Exemplary moisture crosslinker are vinyltrichiorosilane, vinyltrimethoxysilane, vinyltriethoxysilane, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, γ-methacryloxypropylmethyldimethoxysilane, p-styryltrimethoxysilane, γ-methacryloxypropyltrimethoxysilane, γ-methacryloxypropylmethyldiethoxysilane, γ-methacryloxypropyltriethoxysilane, γ-acryloxypropyltrimethoxysilane, N-(β-aminoethyl)-γ-aminopropylmethyldimethoxysilane, N-(β-aminoethyl)-γ-aminopropyltrimethoxysilane, N-(β-aminoethyl)-γ-aminopropyltriethoxysilane, γ-aminopropyltrimethoxysilane, γ-aminopropyltriethoxysilane, N-phenyl-γ-aminopropyltrimethoxysilane, N-2-(aminoethyl)-γ-aminopropyltriethoxysilane, γ-mercaptopropyltrimethoxysilane, γ-mercaptopropyltriethoxysilane, mercaptomethyltrimethoxysilane, dimethoxy-3-mercaptopropylmethylsilane, 2-(2-aminoethylthioethyl)diethoxymethylsilane, 3-(2-acetoxyethylthiopropyl)dimethoxymethylsilane, 2-(2-aminoethylthioethyl)triethoxysilane, dimethoxymethyl-3-(3-phenoxypropylthiopropyl)silane, bis(triethoxysilylpropyl)disulfide, bis(triethoxysilylpropyl)tetrasulfide, 1,4-bis(triethoxysilyl)benzene, bis(triethoxysilyl)ethane, 1,6-bis(trimethoxysilyl)hexane, 1,8-bis(triethoxysilyl)octane, 1,2-bis(trimethoxysilyl)decane, bis(triethoxysilylpropyl)amine, bis(trimethoxysilylpropyl)urea, tris-(3-trimethoxysilylpropyl)isocyanurate, γ-chloropropyltrimethoxysilane, γ-ureidopropyltriethoxysilane, trimethylsilanol, diphenylsilanediol, triphenylsilanol, γ-triethoxysilylpropyl(meth)acrylate, and hexyltrimethoxysilane.

Preferably, the moisture and radiation curable adhesive composition contains a moisture crosslinker, and is selected from the group consisting of vinyltrimethoxysilane, 1,6-bis(trimethoxysilyl)hexane, 1,8-bis(trimethoxysilyl)octane, γ-(meth)acryloxypropyltrimethoxysilane, and combination thereof. More preferably, the moisture crosslinker is vinyltrimethoxysilane available from Evonik under the trade name of Dynasylan VTMO.

The component (e) is present in an amount from 0.05 to 1% by weight, preferably 0.1 to 0.5% by weight based on the total weight of all components.

Other Components

The moisture and radiation curable adhesive composition may further comprise one or more optional additives, resin components and the like to improve or modify properties of the sealant composition, such as flowability, dispensing property, storage stability, curing property and physical property of the cured product.

The components that may be contained in the sealant composition as needed include, but are not limited to, for example, chain extender, organic or inorganic filler, thixotropic agent, diluent, modifier, coloring agent such as pigment and dye, preservative, stabilizer, plasticizer, lubricant, defoamer, leveling agent and the like.

Suitable chain extender useful in the present invention includes but is not limited to methoxy, ethoxy, triethoxysilylethyl terminated polydimethylsiloxanes, etc. Exemplary chain extenders are methoxy terminated polydimethylsiloxanes such as DMS-XM11 (available from Gelest, Inc., Morrisville, Pa.), dimethoxy(epoxypropoxypropyl) terminated polydimethylsiloxanes such as DMS-EX21 (available from Gelest, Inc., Morrisville, Pa.), ethoxy terminated dimethylsiloxanes such as DMS-XE11 (available from Gelest, Inc., Morrisville, Pa.), and triethoxysilylethyl terminated polydimethylsiloxanes such as DMS XT11 (available from Gelest, Inc., Morrisville, Pa.).

The component (e) is present in an amount from 0 to 30% by weight, preferably 0 to 20% by weight, based on the total weight of all components of the moisture and radiation curable adhesive composition according to the present invention.

Suitable fillers, which can be optionally used in the present invention includes, but are not limited to, inorganic fillers such as silica, diatomaceous earth, alumina, zinc oxide, iron oxide, magnesium oxide, tin oxide, titanium oxide, magnesium hydroxide, aluminum hydroxide, magnesium carbonate, barium sulphate, gypsum, calcium silicate, talc, glass bead, sericite activated white earth, bentonite, aluminum nitride, silicon nitride, and the like; organic fillers, such as polymethyl methacrylate, polyethyl methacrylate, polypropyl methacrylate, polybutyl methacrylate, poly acrylonitrile, polystyrene, polybutadiene, polypentadiene, polyisoprene, polyisopropylene, and the like. The filler may be used alone or in combination thereof.

Suitable thixotropic agents, which can be optionally used in the present invention includes, but are not limited to, talc, fume silica, superfine surface-treated calcium carbonate, fine particulate alumina, plate-like alumina; layered compound such as montmorillonite, spicular compound such as aluminum borate whisker, and the like. Talc, fume silica and fine alumina are preferred thixotropic agents.

In one embodiment, the present invention provides a moisture and radiation curable adhesive composition comprising:

20 to 90% by weight, preferably 30 to 80% by weight of component (a);
0.1 to 5% by weight, preferably 1 to 3% by weight of component (b);
0.1 to 0.5% by weight, preferably 0.1 to 0.3% by weight of component (c);
10 to 60% by weight, preferably 15 to 50% by weight of component (d);
1 to 5% by weight, preferably 1 to 3% by weight of component (e); and
5 to 30% by weight, preferably 10 to 20% by weight of chain extender,
wherein the weight percentages are based on the total weight of all components.

The moisture and radiation curable adhesive composition of the present invention is in the form of liquid, and the Brookfield viscosity of the composition is preferably about 50 cps to about 40,000 cps at 25° C. The liquid adhesive composition in such range of viscosity has a good flowing property which makes it easy to be applied or injected onto a substrate. The Brookfield viscosity here is measured by using a Brookfield rotational viscometer (digital Brookfield viscometer, DV-II+, available from BROOKFIELD, US) with a spindle at 25° C. according to ASTM D1084-1997. The selection of spindle for testing will depend on the viscosity level of the adhesive composition.

The moisture and radiation curable adhesive composition of the present invention has a clear appearance, and maintains the clear appearance and excellent optical properties, for example, a light transmittance of greater than 95%, and a haze of less than 1% after curing by radiation and moisture.

Preparation of the Moisture and Radiation Curable Adhesive Composition

A mixer equipped with a mechanical stirrer, condenser, thermometer, heating mantle, nitrogen inlet, and an addition funnel is charged with components (a) and (d), and heated up to 80° C. The contents are mixed at 120 rpm under vacuum for 3 hours, then cooled under vacuum to room temperature. The component (c), (d), (e) and/or chain extender are then added to the mixer under vacuum. The vacuum is broken with nitrogen after 1 hour of mixing for all components.

Process of Bonding Substrates

Another aspect of the present invention provides a process of bonding substrates, comprising,
(i) applying the moisture and radiation adhesive composition according to the present invention onto the substrate to be bonded;
(ii) laminating or stacking the substrate to be bonded to form an assembly;
(iii) photo irradiating the assembly; and
(iv) placing the assembly under the room temperature.

Specifically, the adhesive composition according to the present invention may be coated under pressure onto the surface of the substrate following the predetermined route by means of an automatic dispensing system. Subsequently, another substrate is laminated onto the adhesive, and the height difference between the two substrates is controlled by a dispenser, e.g., Dispenser KAR03, manufactured by IINUMA-GAUGE MFG LTD. After the adhesive is self-leveled on the whole bonding area, photo irradiation is conducted from top to bottom for curing. Light source (such as ultraviolet light and visible light) and high energy ray (such as electronic beam, α-ray, γ-ray and X-ray) can be used herein for photo irradiation, with preference given to ultraviolet light in the wavelength range of about 200 nm to about 400 nm. The energy dose is 3000 mJ/cm2 or more, the power density is about 100 mW/cm². The UV lamp used may be such as Loctite UVALOC 1000, and the irradiation time may generally be about 5 s to about 30 s. Since the marginal areas are within the nontransparent part, it cannot be cured by UV irradiation. The bonded parts can be completely cured by storing the parts at room temperature for about 24 hours, according to the moisture-curable character of the present adhesive composition, without any need for additional equipment and processing.

The Cured Adhesive Product

Another aspect of the present invention also provides a cured adhesive product produced from the moisture and radiation curable adhesive composition.

Surprisingly, the cured adhesive product of the adhesive composition according to the present invention is very soft and specifically exhibited a lower Shore 00 hardness and improved elongation, meanwhile maintaining excellent properties including good stability under high temperature and humidity and high transparency. As such, the cured adhesive product is suitable to be used in display panels, touch panels and optical devices, and can significantly decrease the shrinkage and absorb the stress built up in the substrate, which is known to cause light leakage.

In one embodiment, the cured reaction product of the composition has a Shore 00 hardness of from 0 to 50, preferably from 15 to 45, after 7 days from curing, at 25° C., as measured according to ASTM D2240.

In another embodiment, the cured reaction product of the composition has an elongation of from 100% to 400%, preferably 150% to 350%, after 7 days from curing, at 25° C., as measured according to ASTM D412.

Use of the Moisture and Radiation Curable Adhesive Composition

The moisture and radiation curable adhesive composition of the present invention may be used as a liquid optical clear adhesive (LOCA) for handheld device and display (HHDD), especially for bonding or laminating various elements in the manufacture of display panels, touch panels and optical devices.

For example, the moisture and radiation curable adhesive composition of the present invention can be used in bonding or laminating a transparent substrate with another transparent substrate, or bonding or laminating a transparent substrate with a non-transparent substrate. The transparent substrate comprises glass and transparent plastic etc., and the non-transparent substrate comprises metal, non-transparent plastic, ceramic, stone, leather and wood etc. Plastic may be for example poly(methyl methacrylate) (PMMA), polycarbonate (PC) or polyester (PET) etc.

The following examples are intended to assist one skilled in the art to better understand and practice the present invention. The scope of the invention is not limited by the examples but is defined in the appended claims. All parts and percentages are based on weight unless otherwise stated.

Example

Synthesis of CE-APDMST-1 PDMS

A 5 liter, 4-neck round bottom flask equipped with mechanical stirrer, heating mantle, sparge tube and thermometer was charged with 350 g of a ω-hydroxyl terminated polydimethylsiloxane (having a viscosity of 100 cps, commercially available from AB Specialty Silicones under the trade name of MOH 100). The fluid was heated to a temperature of 60° C. and sparged with nitrogen for a period of time of 30 minutes followed by vacuum for another 30 minutes to remove any volatile components such as water and carbon dioxide. 3-Acryloxypropyltrimethoxysilane ("APTMS", 15.56 g, commercially available from Gelest) and n-butyl lithium in hexane solution (1.6M; 0.12 ml, commercially available from Sigma-Aldrich) were sequentially added to the reactor. The mixture was maintained at a temperature of 60° C. under vacuum for a period of time of 3 hours.

The reactor was then charged with 2187.5 g of an α,ω-hydroxyl terminated polydimethylsiloxane (having a viscosity of 6000 cps, commercially available from Emerald Performance Materials under the trade name of Masil SFR 6000) under nitrogen protection. The fluid was heated to a temperature of 60° C. under vacuum and maintained for a period of time of 60 minutes. Dimethyldimethoxysilane (10.5 g, commercially available from Gelest) was slowly added into the reactor under nitrogen protection, and the mixture was maintained at 60° C. for a period of time of 3 hours. Dry ice (1 g) was then added to the reaction mixture to quench the catalyst. The mixture was vacuum stripped to remove the volatile components. The final product (designated as CE-APDMST-1 PDMS) is a mixture of chain-extended acryloxypropyldimethoxysilyl-terminated PDMSs (polydimethylsiloxanes) represented by formula (1), wherein:
(i) n=430, m and a=68, l and b=0, $A_1$ and $A_2$=acryloxypropyl, $R_1$ and $R_4$=methoxy, and $R_2$, $R_3$, $R_5$ to $R_{14}$=methyl (>80% by weight of the mixture);
(ii) n=430, l, m and a=68, b=0, $A_1$ and $A_2$=acryloxypropyl, $R_1$ to $R_3$ and $R_5$ to $R_{14}$=methyl, and $R_4$=methoxy (about 5% by weight of the mixture); and
(iii) n=430, l, m, a and b=68, $A_1$ and $A_2$=acryloxypropyl, $R_1$ to $R_{14}$=methyl (<5% by weight of the mixture).

Synthesis of CE-APDMST-2 PDMS

A 1 gallon reactor equipped with mechanical stirrer, heating/cooling jacket was charged with 1500 g (79.0%) of an α,ω-hydroxyl terminated polydimethylsiloxane (having a viscosity of 6000 cps, commercially available from Emerald Performance Materials under the trade name of Masil SFR 6000). The fluid was heated to a temperature of 80° C. and vacuum was applied for 60 minutes to remove any volatile component such as water and carbon dioxide. APTMS (11.69 g, 0.92%, commercially available from Gelest) and n-butyl lithium in hexane solution (1.6M; 1.21 ml, 0.042%, commercially available from Sigma-Aldrich) were sequentially added to the reactor. The mixture was maintained at a temperature of 60° C. under vacuum for a period of time of 1.5 hours.

The reactor was then charged with 312 g (16.43%) of a ω-hydroxyl terminated polydimethylsiloxane (having a viscosity of 100 cps, commercially available from AB Specialty Silicones under the trade name of MOH 100) under nitrogen protection. The mixture was maintained at the temperature of 60° C. under vacuum for 2.5 hours. 75 g (5.92%) of dimethyldimethoxysilane (commercially available from Gelest) was slowly added into the reactor under nitrogen protection, and the mixture was maintained at 60° C. for a period of time of 3 hours. Dry ice (1 g) was then added to the reaction mixture to quench the catalyst. The mixture was vacuum stripped to remove the volatile components. The final product (designated as CE-APDMST-2 PDMS) is a mixture of chain-extended acryloxypropyldimethoxysilyl-terminated PDMSs represented by formula (1), wherein:
(i) n=430, m and a=68, l and b=0, $A_1$ and $A_2$=acryloxypropyl, $R_2$, $R_3$, $R_5$ to $R_{14}$=methyl, $R_1$ and $R_4$=methoxy (>70% by weight of the mixture);
(ii) n=430, m=68, a, b and l=0, $A_1$ and $A_2$=acryloxypropyl, $R_1$=methoxy, $R_2$ to $R_{14}$=methyl; and
(iii) m and n=430, a=68, b and l=0, $A_1$ and $A_2$=acryloxypropyl, $R_1$ and $R_4$=methoxy, $R_2$, $R_3$, $R_5$ to $R_{14}$=methyl.

Synthesis of CE-APDMST-3 PDMS

A 2-gallon reactor equipped with mechanical stirrer, heating/cooling jacket was charged with 4483.5 g (97.95%) of an α,ω-hydroxyl terminated polydimethylsiloxane (having a viscosity of 750 cps, commercially available from Emerald Performance Materials under the trade name of Masil SFR 750). The fluid was heated to a temperature of 80° C. and vacuum was applied for 60 minutes to remove any volatile component such as water and carbon dioxide. Methacryloxymethylmethyldimethoxysilane (45.77 g, 1.0%, commercially available from Wacker under the trade name of XL-32) and n-butyl lithium in hexane solution (1.6M; 3.52 ml, 0.05%, commercially available from Gelest) were sequentially added to the reactor. The mixture was maintained at a temperature of 50° C. under vacuum for a period of time of 3 hours. Dry ice (1 g) was then added to the reaction mixture to quench the catalyst, and vacuum was applied 30 minutes later to remove the volatile components. 45.77 g (1%) of hexamethyldisilazane (commercially available from Gelest) was slowly added into the reactor under nitrogen protection, and the mixture was heated up to 120° C. and maintained for a period of time of 6 hours. The mixture was stripped under vacuum at 120° C. for 2 hours to remove the volatile components, and then cooled down to room temperature. The final product (designated as CE-APDMST-3 PDMS) is a mixture of chain-extended methacryloxymethyldimethylsilyl-terminated PDMSs represented by formula (1), wherein:
(i) n, a and m=190, l and b=0, $A_1$ and $A_2$=methacryloxymethyl, $R_1$ to $R_{14}$=methyl (about 80% by weight of the mixture);
(ii) n=190, m=190, l, a and b=0, $A_1$ and $A_2$=methacryloxymethyl, $R_1$ to $R_3$ and $R_5$ to $R_{14}$=methyl, and $R_4$=methoxy; and
(iii) m and n=190, l, a and b=0, $A_1$ and $A_2$=methacryloxymethyl, $R_1$ to $R_{14}$=methyl.

Synthesis of DMA-6000

A 2 gallon reactor equipped with mechanical stirrer, heating/cooling jacket was charged with 4932.5 g of an α,ω-hydroxyl terminated polydimethylsiloxane (having a viscosity of 6000 cps, commercially available from Emerald Performance Materials under the trade name of Masil SFR 6000). The fluid was heated to a temperature of 50° C. and vacuum was applied for 60 minutes to remove any volatile component such as water and carbon dioxide. APTMS (65 g, commercially available from Gelest) and n-butyl lithium in hexane solution (1.6M; 3.9 ml, commercially available from Sigma-Aldrich) were sequentially added to the reactor. The mixture was maintained at a temperature of 50° C. under vacuum for a period of time of 4 hours. Dry ice (1 g) was then added to the reaction mixture to quench the catalyst. The mixture was vacuum stripped to remove the volatile components. The final product is a diacryloxypropyldimethoxysilyl-terminated linear PDMS homopolymer, and designated as DMA-6000 used in the comparative example.

Synthesis of Reactive Plasticizer

A 5 liter, 4-neck round bottom flask equipped with mechanical stirrer, heating mantle, sparge tube and thermometer was charged with 2425 g of a ω-hydroxyl terminated polydimethylsiloxane (having a viscosity of 1000 cps, commercially available from AB Specialty Silicones under the trade name of MOH 1000). The fluid was heated to a temperature of 60° C. and sparged with nitrogen for a period of time of 30 minutes followed by vacuum for another 30 minutes to remove any volatile components such as water and carbon dioxide. γ-Acryloxypropyltrimethoxysilane ("APTMS", 36 g, commercially available from Gelest) and n-butyl lithium in hexane solution (1.6M; 1.89 ml, commercially available from Sigma-Aldrich) were sequentially added to the reactor. The mixture was maintained at a temperature of 60° C. under vacuum for a period of time of 3 hours. Dry ice (1 g) was then added to the reaction mixture to quench the catalyst. The mixture was vacuum stripped to remove the volatile components. The final product is a monoacryloxypropyldimethoxysilyl-terminated linear PDMS, and used as the reactive plasticizer in the adhesive compositions as shown in Table 1.

Synthesis of Chain Extender

A 2 gallon reactor equipped with mechanical stirrer, heating/cooling jacket was charged with 4400 g of an α,ω-hydroxyl terminated polydimethylsiloxane (having a viscosity of 70 cps, commercially available from Emerald Performance Materials under the trade name of Masil SFR 70). The fluid was heated to a temperature of 60° C. and vacuum was applied for 60 minutes to remove any volatile component such as water and carbon dioxide. Dimethyldimethoxysilane (320 g, commercially available from Gelest) and n-butyl lithium in hexane solution (1.6M; 3.64 ml, commercially available from Sigma-Aldrich) were sequentially added to the reactor. The mixture was maintained at a temperature of 60° C. under nitrogen protection for a period of time of 3 hours. Dry ice (1 g) was then added to the reaction mixture to quench the catalyst. The mixture was vacuum stripped to remove the volatile components. The final product will be used as the chain extender in the examples.

Following the above-mentioned preparation process, adhesive compositions according to the present invention were obtained. Names and amounts of the components are listed in Table 1.

piece of glass on each side, followed by a 60 second UV exposure from both sides with UVA intensity at 75 mW/cm$^2$. The polyethylene films were peeled off and the cured products to be tested were then kept in a 25° C., 50% relative humidity chamber for 7 days.

The hardness according to ASTM D2240 and the elongation according to ASTM D412 of the cured products of the compositions in Table 1 are listed in Table 2.

TABLE 2

Test results of the examples

| | Results | | | | | | |
|---|---|---|---|---|---|---|---|
| Test | Ex. A | Ex. B | Ex. C | Ex. D | Ex. E | Ex. F | Ex. G comp |
| Shore 00 Hardness | 35 | 25 | 27 | 25 | 31 | 40 | 68 |
| Elongation (%) | 200 | 310 | 250 | 210 | 200 | 340 | 75 |

After 7 day at 25° C.

As shown in Table 1, Examples A to F are inventive examples of adhesive compositions having the chain extended polyorganosiloxanes according to the present invention. Example G only comprises one di(meth)acryloxy terminated linear polyorganosiloxane homopolymer and is listed as a comparative example which is a typical example of conventional adhesive formulations.

As demonstrated in Table 2, the Shore 00 hardness results of the cured products of Examples A to F are within the range of 25 to 40, which are significantly lower than the range (50 to 70) of conventional UV and moisture curing silicone based adhesives, e.g. Example G.

It is also clear in Table 2 that elongation results of the cured products of Examples A to F are much larger than that of Example G, which indicates that the inventive adhesive compositions are much softer than conventional formulations.

TABLE 1

The compositions of Examples A to G (Ex. A to Ex. G)

| | Amount (wt %) | | | | | | |
|---|---|---|---|---|---|---|---|
| Component | Ex. A | Ex. B | Ex. C | Ex. D | Ex. E | Ex. F | Ex. G comp |
| CE-APDMST-1 PDMS | 65.0 | 60.0 | 58.0 | — | — | — | — |
| CE-APDMST-2 PDMS | — | — | — | 36.0 | 48.0 | — | — |
| CE-APDMST-3 PDMS | — | — | — | — | — | 80.0 | — |
| DMA-6000 | — | — | — | — | — | — | 95.8 |
| Photoinitiator[1] | 2.0 | 2.0 | 2.0 | 2.0 | 2.0 | 2.0 | 2.0 |
| Moisture catalyst[2] | 0.2 | 0.2 | 0.2 | 0.2 | 0.2 | 0.2 | 0.2 |
| Reactive plasticizer | 20.8 | 15.8 | 27.8 | 49.8 | 27.8 | 15.8 | — |
| Chain extender[3] | 10 | 20 | 10 | 10 | 20 | — | — |
| Moisture crosslinker[4] | 2.0 | 2.0 | 2.0 | 2.0 | 2.0 | 2.0 | 2.0 |

[1]Photoinitiator: 2-hydroxy-2-methyl-1-phenyl-propan-1-one, commercially available from Ciba Specialty Chemicals under the trade name of Darocur 1173.
[2]Moisture catalyst: dimethyldineodecanoatetin, commercially available from Momentive Performance Materials Inc. under the trade name of FOMREZ UL-28.
[3]Chain extender: linear structured PDMS end-capped with methoxy groups synthesized as above.
[4]Moisture crosslinker: vinyltrimethoxysilane available from Evonik under the trade name of Dynasylan VTMO.

For the tests, all components (with a total amount about 50 grams) were added to a plastic jar which was then spanned 3 times in a speed mixer at 3000 rpm for 30 seconds each time. 32 grams of the material was poured into 6 inches×6 inches metal frame with a polyethylene film and a It is believed that such excellent results are due to the assumption that the controlling of the crosslinkable functional groups on the polymer chain of the polyorganosiloxanes brings about the improvement of the softness and elongation of the cured products. Therefore, the stress built up in the substrates during assembly and light leaking can be largely absorbed and decreased by the inventive adhesives.

In addition, during the test, the inventive adhesives also exhibited properties including good adhesion to different substrates, good transmittance, good stability under room temperature, high temperature and high humidity.

What is claimed is:

1. A polyorganosiloxane represented by the structural formula (1):

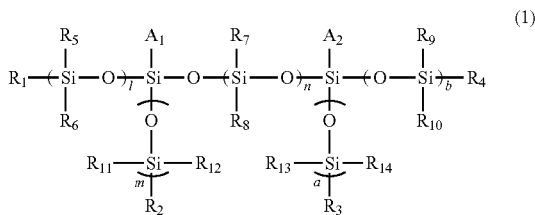

wherein:
R$_1$ and R$_4$-R$_{10}$ are each independently selected from the group consisting of C$_1$-C$_{20}$ alkyl, C$_1$-C$_{20}$ alkoxyl, C$_2$-C$_{20}$ alkenyl, C$_3$-C$_{20}$ cycloalkyl, C$_7$-C$_{22}$ aralkyl, and (meth)acryloxy, wherein at least one of R$_1$ or R$_4$ is a C$_1$-C$_{20}$ alkoxyl,
R$_2$, R$_3$ and R$_{11}$-R$_{14}$ are selected from C$_1$-C$_{20}$ alkyl, C$_2$-C$_{20}$ alkenyl, C$_3$-C$_{20}$ cycloalkyl, and C$_7$-C$_{22}$ aralkyl,
a is an integer of from 0 to 1000,
b is an integer of from 0 to 1000,
l is an integer of from 0 to 1000,
m is an integer of from 2 to 1000,
n is an integer of from 1 to 1500,
A$_1$ and A$_2$ are each independently represented by the formula (2):

wherein:
R$_{15}$ is C$_1$-C$_{20}$ alkylene,
R$_{16}$ is C$_6$-C$_{21}$ arylene,
R$_{17}$ is C$_1$-C$_{20}$ alkylene,
R$_{18}$ is (meth)acryloxy,
c is an integer of from 0 to 10,
d is an integer of from 0 to 10, and
e is an integer of from 0 to 10, wherein at least one of c or d or e is greater than 0.

2. The polyorganosiloxane according to claim 1, wherein R$_1$ and R$_4$-R$_{10}$ are each independently selected from the group consisting of C$_1$-C$_8$ alkyl, C$_1$-C$_8$ alkoxyl, C$_2$-C$_8$ alkenyl, C$_3$-C$_8$ cycloalkyl, and C$_7$-C$_{16}$ aralkyl and R$_2$, R$_3$ and R$_{11}$-R$_{14}$ are selected from the group consisting of C$_1$-C$_8$ alkyl, C$_2$-C$_8$ alkenyl, C$_3$-C$_8$ cycloalkyl, and C$_7$-C$_{16}$ aralkyl.

3. The polyorganosiloxane according to claim 1, wherein R$_{15}$ is C$_1$-C$_8$ alkylene; and/or R$_{16}$ is C$_6$-C$_9$ alkylene; and/or R$_{17}$ is C$_1$-C$_8$ alkylene.

4. The polyorganosiloxane according to claim 1, wherein c is an integer of from 1 to 5, d is an integer of from 1 to 5, and e is an integer of from 1 to 5.

5. The polyorganosiloxane according to claim 1, wherein n is 430, m and a are 68, l and b are 0, A$_1$ and A$_2$ are acryloxypropyl, R$_2$, R$_3$, R$_5$ to R$_{14}$ are methyl, and R$_1$ and R$_4$ are methoxy.

6. The polyorganosiloxane according to claim 1, wherein n, a and m are 190, l and b are 0, A$_1$ and A$_2$ are methacryloxymethyl, and R$_1$ to R$_{14}$ are methyl.

7. The process for producing the polyorganosiloxane according to claim 1, comprising the steps of:
(1) end-capping a silanol-terminated polyorganosiloxane with an alkoxysilane having (meth)acryloxy to form a polyorganosiloxane;
(2) chain extending the polyorganosiloxane obtained in step (1) by reacting with a silanol-terminated polyorganosiloxane to form a product; and
(3) end-capping residual silanol groups contained in the product obtained in step (2).

8. The process according to claim 7, wherein the silanol-terminated polyorganosiloxane in step (1) is an α,ω-hydroxyl terminated polydimethylsiloxane or an ω-hydroxyl terminated polydimethylsiloxane.

9. The process according to claim 7, wherein the alkoxysilane having (meth)acryloxy is selected from γ-(meth)acryloxymethyltrimethoxysilane, γ-(meth)acryloxymethylmethyldimethoxysilane, γ-(meth)acryloxymethylmethyldiethoxysilane, γ-(meth)acryloxymethylethyldimethoxysilane, γ-(meth)acryloxymethyltriethoxysilane, γ-(meth)acryloxyethyltrimethoxysilane, γ-(meth)acryloxyethylmethyldimethoxysilane, γ-(meth)acryloxyethylmethyldiethoxysilane, γ-(meth)acryloxyethylethyldimethoxysilane, γ-(meth)acryloxyethyltriethoxysilane, γ-(meth)acryloxypropyltrimethoxysilane, γ-(meth)acryloxypropylmethyldimethoxysilane, γ-(meth)acryloxypropylmethyldiethoxysilane, γ-(meth)acryloxypropylethyldimethoxysilane γ-(meth)acryloxypropyltriethoxysilane, and combinations thereof.

10. The process according to claim 7, wherein the silanol-terminated polyorganosiloxane in step (2) is an α,ω-hydroxyl terminated polydimethylsiloxane or an ω-hydroxyl terminated polydimethylsiloxane.

11. A moisture and radiation curable composition, comprising:
(a) the polyorganosiloxane according to claim 1,
(b) a photoinitiator,
(c) a moisture catalyst,
(d) a reactive plasticizer, and
(e) optionally, a moisture crosslinker.

12. The moisture and radiation curable composition according to claim 11, wherein component (a) is a mixture of different polyorganosiloxanes with each polyorganosiloxane of component (a) being of formula 1.

13. The moisture and radiation curable composition according to claim 11, wherein component (a) comprises at least one polyorganosiloxane selected from:
(i) n=430, m and a=68, l and b=0, A$_1$ and A$_2$=acryloxypropyl, R$_1$ and R$_4$=methoxy, and R$_2$, R$_3$, R$_5$ to R$_{14}$=methyl;
(ii) n=430, l, m and a=68, b=0, A$_1$ and A$_2$=acryloxypropyl, R$_1$ to R$_3$ and R$_5$ to R$_{14}$=methyl, and R$_4$=methoxy;
(iii) n=430, m=68, a, b and l=0, A$_1$ and A$_2$=acryloxypropyl, R$_1$=methoxy, R$_2$ to R$_{14}$=methyl;
(iv) m and n=430, a=68, b and l=0, A$_1$ and A$_2$=acryloxypropyl, R$_1$ and R$_4$=methoxy, and R$_2$, R$_3$, R$_5$ to R$_{14}$=methyl; and
(v) n=190, m=190, l, a and b=0, A$_1$ and A$_2$=methacryloxymethyl, R$_1$ to R$_3$ and R$_5$ to R$_{14}$ methyl, and R$_4$=methoxy.

14. The moisture and radiation curable composition according to claim 11, wherein component (a) is present in an amount from 20 to 90% by weight, based on the total weight of the components.

15. The moisture and radiation curable composition according to claim 11, wherein component (d) is present in an amount from 10 to 60% by weight, based on the total weight of the components.

16. The moisture and radiation curable composition according to claim 11, wherein component (e) is present in an amount from 1 to 5% by weight based on the total weight of the components.

17. The moisture and radiation curable composition according to claim 11, wherein the composition further comprises a chain extender present in an amount from 5 to 30% by weight, based on the total weight of the components.

18. A cured reaction product of the moisture and radiation curable adhesive composition according to claim 11.

19. A substrate which is coated on at least one surface with the moisture and radiation curable adhesive composition according to claim 11.

* * * * *

UNITED STATES PATENT AND TRADEMARK OFFICE
CERTIFICATE OF CORRECTION

PATENT NO. : 10,100,155 B2
APPLICATION NO. : 15/695104
DATED : October 16, 2018
INVENTOR(S) : Zhixiang Lu et al.

Page 1 of 1

It is certified that error appears in the above-identified patent and that said Letters Patent is hereby corrected as shown below:

In the Specification

Column 5, Line 25, change "$R_{15}$ is $C_1$–$C_4$ alkylene" to -- $R_{15}$ is $C_1$-$C_8$ alkylene --.

Column 10, Line 15, change "bis(2,4,6-trimethylbenzoyfl)-phenylphosphine oxide" to -- bis(2,4,6-trimethylbenzoyl)-phenylphosphine oxide --.

Column 10, Line 21, change "bis(2,4,6-trimethylbenzoyfl)-phenylphosphine oxide" to -- bis(2,4,6-trimethylbenzoyl)-phenylphosphine oxide --.

Signed and Sealed this
Ninth Day of July, 2019

Andrei Iancu
*Director of the United States Patent and Trademark Office*